3,487,907
PROCESS FOR THE MICROBIOLOGICAL PREPARATION OF STEROIDS HAVING NO CARBONACEOUS SUBSTITUENT IN THE 17-POSITION
Willem Frederik van der Waard, Delft, Netherlands, assignor to Koninklijke Nederlandsche Gist-En Spiritusfabriek N.V., Delft, Netherlands, a corporation of the Netherlands
No Drawing. Filed Apr. 11, 1967, Ser. No. 629,896
Claims priority, application Netherlands, Apr. 28, 1966, 6605738
Int. Cl. C12d 13/08; C07c 167/18
U.S. Cl. 195—51                    8 Claims

ABSTRACT OF THE DISCLOSURE

This invention relates to a process for the preparation of steroids free of a carbonaceous substituent on the 17 carbon atom which comprises the steps of subjecting a 3,5-cyclosteroid having an aliphatic substituent containing at least 8 carbon atoms on the 17 carbon atom to the action of a micro-organism which causes breakdown of the carbonaceous side chain on the 17 carbon atom and degradation of the ring system of the corresponding normal steroids having a cyclopentanoperhydrophenanthrene configuration, in a culture medium and recovering said steroid free of a carbonaceous substituent on the 17 carbon atom. The resultant 3,5-cycloandrostanic steroids are useful as intermediates in known steroid synthesis steps.

CLAIM OF PRIORITY

Under the provisions of 35 U.S.C. 119, the right of priority is hereby claimed based on the corresponding Netherlands patent application No. 6605738, filed Apr. 28, 1966.

THE PRIOR ART

Naturally occurring steroid components have long been used as starting materials for the preparation of steroid hormones. However, a process is still needed in which steroids having an aliphatic radical containing at least 8 carbon atoms on the 17 carbon atom can be converted in a simple way into steroids with a lower molecular weight, such as a compound with an androstane skeleton. These products can serve as starting materials for the preparation of other compounds with androgenic, estrogenic, anabolic, and anticonceptional activity.

It has long been known that certain micro-organisms are capable of completely breaking down and destroying steroids having an aliphatic side-chain containing at least 8 carbon atoms on the 17 carbon atom, such as cholesterol. Thus in 1913 Söhngen found that bacteria of the genus Mycobacterium are capable of reproduction in a medium containing cholesterol as the sole source of carbon (Zentralblatt Bakteriologie II Abt. 37 [1913], 595).

In 1942 Tak devoted to these phenomena a research in the course of which he isolated a bacterium which he called *Mycobacterium cholesterolicum* (Ant. van Leeuwenhoek 8 [1942], 32). After this, several other publications on the degradation of cholesterol appeared, in which microorganism of the genera Proactinomyces, Azotobacter, Flavobacterium, Aerobacter, Pseudomonas, Nocardia, and Streptomyces are mentioned.

In these conversions cholesterol is destroyed completely and broken down into compounds having a low molecular weight, and no appreciable amounts of intermediates with a steroid character could be isolated. $\Delta^4$-cholestene-3-one and 7-dehydrocholesterol are sometimes detected in small amounts. Tak mentions a small amount of $\Delta^4$-cholestene-3,6-dione recovery in one instance.

Whitmarsh tried to slow down the degradation of cholesterol (with a Nocardia species) by addition of an organic inhibitor, hoping thus to isolate intermediates, which might give an indication of the route by which this degradation proceeds. The inhibitor he used was 8-hydroxyquinoline and he succeeded in detecting 3-keto-$\Delta^4$-bis-norcholenic acid in acid extracts of the culture medium, as well as a very small amount of 3-keto-$\Delta^{1,4}$-bis-norcholadienic acid. In the neutral fraction small amounts of $\Delta^{1,4}$ - androstadiene - 3,17-dione and $\Delta^4$-androstene-3,17-dione were found (Biochemical Journal 90 [1964], 23P).

Sih et al. examined the action of micro-organisms on derivatives of cholesterol. They used micro-organisms of the genera Nocardia and Mycobacterium, which they caused to act on $\Delta^{1,3,5(10)}$-cholestatriene, which, however, was not attacked at all in contrast to cholesterol, which was readily broken down by these micro-organisms (Abstracts of Papers of the 150th Meeting of the American Chemical Society [1965], 13Q). On the other hand 19-hydroxy - $\Delta^4$ - cholestene-3-one and 6,19-oxido-$\Delta^4$-cholestene-3-one were readily converted by these micro-organisms into estrone and 6,19,-oxido-$\Delta^4$-androstene-3,17-dione, respectively.

Therefore, one cannot predict what derivatives of cholesterol will be converted by certain micro-organisms in such a way that degradation of the 17 side-chain occurs while the steroid ring system is preserved.

OBJECTS OF THE INVENTION

An object of the present invention is the development of a process for the preparation of steroids free of a carbonaceous substituent on the 17 carbon atom which comprises the steps of subjecting a 3,5-cyclosteroid having an aliphatic substituent containing at least 8 carbon atoms on the 17 carbon atom to the action of a micro-organism which causes breakdown of the carbonaceous side chain on the 17 carbon atom and degradation of the ring system of the corresponding normal steroids having a cyclopentanoperhydrophenanthrene configuration, in a culture medium, and recovering said steroid free of a carbonaceous substituent on the 17 carbon atom.

These and other objects of the present invention will become more apparent as the description thereof proceeds.

DESCRIPTION OF THE INVENTION

Now it has been found that steroids having no carbonaceous substituent on the 17 carbon atom can be prepared by microbiological conversion of steroids having a saturated or unsaturated aliphatic radical containing at least 8 carbon atoms on the 17 carbon atom when the starting materials are 3,5-cyclosteroids (or i-steroids) having a saturated or unsaturated aliphatic radical containing at least 8 carbon atoms on the 17 carbon atom. Micro-organisms which break down the side chain in the 17-position and degrade the ring system of corresponding normal steroids are used.

The starting products used are 3,5-cyclosteroids having a side chain containing at least 8 carbon atoms on the 17 carbon atom. The principal examples thereof are i-cholesterol, i-sitosterol, and i-stigmasterol. It is also possible to use derivatives of these, obtained by esterification, etherification, or oxidation of the 6-hydroxyl group. The 6-hydroxyl group may also have been eliminated and/or other modifications may have been made in the molecule of the starting steroids provided the steroids have the 3,5-cyclo structure and contain the side chain in question in the 17-position. The side chain on the 17 carbon atom of these steroids is preferably composed of carbon and hydrogen only.

The 3,5-cyclosteroids, such as i-cholesterol, can be prepared in a simple way from the corresponding normal steroids by the method of E. M. Kosower and S. Winstein, described in J. Am. Chem. Soc. 78 (1956), 4347.

Any micro-organisms which break down not only the side chain in the 17-position, but also degrades the ring system of normal steroids having a saturated or unsaturated aliphatic radical containing at least 8 carbon atoms on the 17 carbon atom can be used in the process of the invention. In particular micro-organisms of the genus Mycobacterium are suitable. Particularly suitable are *Mycobacterium phlei* and *Mycobacterium butyricum*.

The process of the present invention is preferably carried out by cultivating the micro-organism utilized in a medium containing an inorganic or organic source of nitrogen, such as amino acids, ammonium salts, nitrates of alkali and alkaline earth metals. Peptone, corn steep liquor, yeast extract, cottonseed meal, soybean meal, "distillers' solubles" and the like are also very suitable. The media need not contain any assimilable sources of carbon, such as sugar, starch, or polyvalent alcohols, although their presence has no detrimental effect on the course of the process. Furthermore, a suitable medium also contains the usual quantity of salts, such as phosphates, sulfates, chlorides of alkali and alkaline earth metals. The required trace elements are usually present in sufficient amounts owing to the use of tap water. When natural sources of nitrogen consisting of a complicated mixture, such as corn steep liquor, are used, the additions of mineral salts may often be omitted.

The media are sterilized in the conventional way after the pH value has been adjusted to 4.0 to 8.5. A pH of about 7.0 will be most suitable in the majority of cases.

When the cells have grown sufficiently in the medium under constant aeration, the steroid, e.g., i-cholesterol or i-$\beta$-sitosterol, may be added, either dissolved in a suitable solvent, such as N,N-dimethylformamide, or in the form of a fine suspension in water.

The starting steroid can be added 0 to 72 hours after inoculation, although reasonable results are also achieved with later addition. The addition of the steroid preferably takes place 24 to 48 hours after inoculation of the culture when the micro-organisms have reproduced sufficiently. A very early addition, for instance, immediately after the inoculation of the culture medium, is also possible and gives useful results.

The conversion of the steroid in general takes place with constant aeration at a tempeature varying between 20° and 45° C., although the process will also proceed at a higher or lower temperature. The conversion is preferably made to take place at a temperature which is the optimum temperature for the micro-organism utilized. This temperature will generally be between 25° and 35° C. Thus, for Mycobacterium species a temperature of 30° C. will often be suitable. It is not necessary for growth of the micro-organism and conversion of the steroid to take place at the same temperature. Thus, the micro-organism may first be cultivated for 24 hours at 26° C., after which, upon addition of the steroid, the temperature is raised, say to 30° C.

In general, the fermentation conditions will have to be adapted to the demands of the micro-organism utilized according to the methods commonly applied in microbiology.

The conversion of the steroid added takes one to seven days, but as a rule the quantity of the desired products will not increase appreciably any further after three days.

When i-cholesterol, i-$\beta$-sitosterol, or i-stigmasterol is used as substratum, the main product formed is 6-hydroxy-3,5-cycloandrostane-17-one, with small amounts of the corresponding 6-keto compound in addition. When, instead of i-cholesterol, the corresponding 6-methoxy compound is used, the formation of the 6-ketosteroid of course will not take place. In many cases small amounts of hitherto unidentified by-products are also found by thin-layer chromatography of extracts of the culture liquids.

The steroid products formed can be removed from the culture medium and purified further by conventional methods. Thus, after completion of the fermentation and conversion, they may be extracted from the culture medium with an organic solvent, such as methyl isobutyl ketone, ethyl acetate, methylene chloride, chloroform, and the like. These extracts are evaporated to dryness, upon which the remaining solid is crystallized from a suitable solvent or, if necessary, separated into its components, e.g., by chromatography followed by crystallization.

The concentration of starting steroid which can be used in the process depends upon the micro-organism employed, and as a rule will be between 0.5 and 50 gm./l. For species of the genus Mycobacterium, the concentration is preferably 2 to 3 gm./l. The starting steroid is converted into the desired products in 48 hours.

The 3,5-cyclosteroids obtained by microbiological conversion are important starting materials for the synthesis of steroid hormones. Thus, 3,5-cyclo-6$\beta$-hydroxy-androstane-17-one obtained from i-cholesterol can be converted in a simple way by the method of A. F. Wagner and E. S. Wallis, described in J. Am. Chem. Soc. 72 (1950), 1047, into 3$\beta$-hydroxy-$\Delta^5$-androstene-17-one, which can be converted further into steroid hormones of the androstane and pregnane series by known methods. It is also possible to convert 3,5-cyclo-6$\beta$-hydroxy-androstane-17-one by oxidation with lead tetra-acetate, as mentioned by K. Tanabe et al. in Chem. Pharm. Bull. (Tokyo) 10 (1962), 1126, into the corresponding 6$\beta$,19-oxido derivative, which may serve as starting product for the preparation of steroid hormones having the 19-nor-configuration or an aromatic A-ring.

The invention is elucidated by reference to the following examples which, however, are not to be deemed to limit the scope of the invention in any way.

EXAMPLE I

An inoculation culture of *Mycobacterium phlei*, Strain KNGSF 70, is prepared by inoculating a medium consisting of a solution of 10 gm. of yeast extract (DIFCO) in one liter of tap water of a pH of 6.8, which has been previously sterilized for 30 minutes at 110° C., with a culture of this bacterium or broth agar, incubated for three days at 30° C. The medium is contained in 500-ml. shaker flasks. Each of the flasks contains 100 ml. of medium.

The culture is shaken for 48 hours at 30° C. on a shaking apparatus of the rotary type at a rate of 250 r.p.m. and a stroke of 2½ cm., after which the bacteria have developed sufficiently for further inoculation.

The main fermentation medium is prepared by diluting in each case 5 gm. of corn steep liquor (calculated as dry matter) with tap water to one liter and subsequently bringing the liquid to a pH of 7.0 with dilute sodium hydroxide solution. This medium is placed in 40 shaker flasks which are sterilized for 30 minutes at 110° C.

Each of the flasks contains 100 ml. of medium and has a capacity of 500 ml. The medium in these flasks is now inoculated by adding 5 ml. of the above-mentioned inoculation culture to each of the flasks under sterile conditions. The flasks are shaken in the same way as the inoculation culture for 24 hours.

Then 200 mg. of i-cholesterol is added to each of the flasks in the form of a suspension in water, after which the flasks are shaken again under the same conditions.

After four days shaking it is found that substantially two new products have formed, the amounts of which do not increase any further. The contents of the 40 flasks are, therefore, combined and the culture liquid (4 liters) is extracted twice with 2 liters of methyl isobutyl ketone. From a thin layer chromatogram of the extract (on silicagel in the system chloroform ethyl acetate [9:1]) it appears that two substances have been formed, which are more polar than i-cholesterol. The most polar substance is called A for convenience, the other B. The extract is evaporated to dryness under reduced pressure. The remaining oil (6.9 gm.) is dissolved in a small quantity of benzene and the solution is transferred to an aluminum oxide column (length, 46 cm.; cross-section, 2.6 cm.; adsorbent, 265 gm. of $Al_2O_3$, activity III). The column is first eluted with benzene and fractions of 20 ml. each are collected. The fractions 9 to 30 inclusive contain i-cholesterol. After fraction 30, benzene-acetone (10:1) is used as eluent. Fractions 38 to 42 inclusive, which contain mainly B, are combined and evaporated to dryness under reduced pressure. The remaining solid substance is crystallized from acetone-heptane. The product obtained is 1.2 gm. of pure B with the following physical constants:

Melting point: 180° to 183° C.;
Specific rotation $[\alpha]_D^{20} = +118°$ (c.=0.5 in chloroform);
I.R. spectrum (chloroform), 1734 cm.$^{-1}$ (C=0, five-ring ketone), 1681 cm.$^{-1}$ (C=0, six-ring ketone, conjugated with cyclopropane ring).
Elemental analysis: $C_{19}H_{26}O_2$. Calculated: C, 79.68%; H, 9.15%. Found: C, 79.61%; H, 9.17%.

From the physical constants and the infrared spectrum it appears that B is identical with $3\alpha,5\alpha$-cycloandrostane-6,17-dione.

The fractions 44 to 52 inclusive, which contain mainly A, are evaporated to dryness under reduced pressure. The remaining solid substance is crystallized from acetone-heptane. The product obtained is 2.1 gm. of pure A with the following physical constants:

Melting point: 135° to 138° C.;
Specific rotation $[\alpha]_D^{20} = +125°$ (c.=1.0 in 96% ethanol);
I.R. spectrum (chloroform), 3610 cm.$^{-1}$ (OH, in the same position as in i-cholesterol), 1736 cm.$^{-1}$ (C=O, five-ring ketone).
Elemental analysis: $C_{19}H_{28}O_2$. Calculated: C, 79.12%; H, 9.79%. Found: C, 79.08%; H, 9.77%.

From the physical constants and the infrared spectrum, it appears that A is identical with $3\alpha,5\alpha$-cycloandrostane-$6\beta$-ol-17-one.

EXAMPLE II

In the way described in Example I an inoculation culture of *Mycobacterium phlei*, Strain KNGSF 70 is prepared. This inoculation culture is used to inoculate a medium of the following composition:

| | Gm./l. |
|---|---|
| Corn steep liquor (dry matter) | 5 |
| $Na_2HPO_4.2H_2O$ | 1.25 |
| Sodium monoglutaminate | 2.5 |

Tap water: pH 6.0 to give 1 liter of culture medium.

After 24 hours shaking at 30° C., 200 mg. of i-cholesterol in the form of a suspension in water is added to each 100-ml. portion of the well developed culture, after which shaking is continued under the conditions previously described.

Within 48 hours after addition, the i-cholesterol is found to have been converted completely into a product mainly consisting of 6-hydroxy-3,5-cycloandrostane-17-one. From the chromatograms it appears that the quantity of the corresponding 6-oxo compound is small.

The culture liquid (total 4 liters) is extracted twice with 2 liters of ethyl acetate. The extract is evaporated to dryness under reduced pressure. The remaining solid substance is dissolved in 500 ml. of methyl isobutyl ketone, after which the solution is washed twice with 30 ml. of 0.2 N sodium hydroxide solution and then three times with 50 ml. of water. The extract is subsequently stirred with 2 gm. of decolorizing carbon and filtered. The filtrate is evaporated under reduced pressure to a syrupy liquid, which is dissolved in 20 ml. of heptane. After inoculation $3\alpha,5\alpha$-cycloandrostane - $6\beta$ - ol - 17 - one crystallizes. An amount of 2.4 gm. of product with a melting point of 128° to 136° C. is obtained. Recrystallization from acetone-heptane gives a product with a melting point of 134° to 138° C.

EXAMPLE III

The same procedure as described in Example II is followed, but this time 200 mg. of 6-methoxy-i-cholesterol is added to each of the flasks. It appears from the chromatograms that only one product is formed, $6\beta$-methoxy-$3\alpha,5\alpha$-cycloandrostane-17-one.

EXAMPLE IV

The procedure is the same as in Example II, but this time *Mycobacterium butyricum* ATCC 11,314 is used. An amount of 200 mg. of i-cholesterol is added to each of the flasks. After 48 hours it appears to have been converted partly into 6-hydroxy- and 6-keto-3,5-cycloandrostane-17-one.

EXAMPLE V

Flasks with a culture of *Mycobacterium phlei*, Strain KNGSF 70 are prepared as in Example II. This time 200 mg. of i-$\beta$-sitosterol are added in the form of a suspension in water to each flask with 100 ml. of culture. In all, 40 flasks are used, containing a total of 8 gm. of steroid. The further fermentation and treatment are entirely the same as described in Example II. The yield is 2.15 gm. of a product with a melting point of 126 to 135° C. After two crystallizations from acetone-heptane a product with a melting point of 136 to 138° C. is obtained.

EXAMPLE VI

The procedure is the same as described in Examples II and V, with the difference that 200 mg. of i-stigmasterol is now added to each of the flasks. The yield is 1.85 gm. of $6\beta$-hydroxy-$3\alpha,5\alpha$-cycloandrostane-17-one with a melting point of 126 to 135° C.

The preceding specific embodiments are illustrative of the process of the invention. It is obvious, however, that other expedients known to those skilled in the art can be employed without departing from the spirit of the invention or the scope of the appended claims.

I claim:
1. A process for the preparation of steroids free of carbonaceous substituent on the 17 carbon atom which comprises the steps of subjecting a 3,5-cyclosteroid oxygenated at position 6 and having an aliphatic substituent containing at least 8 carbon atoms on the 17 carbon atom to the action of a micro-organism of Mycobacterium and recovering said steroid free of a carbonaceous substituent on the 17 carbon atom.

2. The process of claim 1 wherein said starting 3,5-cyclosteroid is selected from the group consisting of i-cholesterol, i-sitosterol and i-stigmasterol.

3. The process of claim 1 wherein said micro-organism of the genus Mycobacterium is *Mycobacterium phlei*.

4. The process of claim 1 wherein said micro-organism of the genus Mycobacterium is *Mycobacterium butyricum*.

5. A process for the preparation of a 3,5-cyclosteroid having a 3,5-cyclo-cyclopentano-phenanthrene configuration and being free of a carbonaceous substituent on the 17 carbon atom which comprises the steps of subjecting a steroid having a 3,5-cyclo-cyclopentanoperhydrophenanthrene configuration and an aliphatic hydrocarbon substituent containing at least 8 carbon atoms on the 17 carbon atom to the action of a culture of an organism of the genus Mycobacterium in a culture medium for a period of about one to seven days, and recovering said 3,5-cyclosteroid.

6. The process of claim 5 wherein said steroid having a 3,5-cyclo-cyclopentanophenanthrene configuration and an aliphatic hydrocarbon substituent containing at least 8 carbon atoms on the 17 carbon atom is selected from the group consisting of i-cholesterol, i-sitosterol and i-stigmasterol.

7. The process of claim 5 wherein said organism of the genus Mycobacterium is *Mycobacterium phlei*.

8. The process of claim 5 wherein said organism of the genus Mycobacterium is *Mycobacterium butyricum*.

References Cited

UNITED STATES PATENTS 3,102,080  8/1963  Raspe et al.
3,388,042  6/1968  Arima et al.

OTHER REFERENCES

Kosower et al.: Jour. Am. Chem. Soc., vol. 78, pp. 4347 and 4348 (1956).

ALVIN E. TANENHOLTZ, Primary Examiner

U.S. Cl. X.R.

260—239.55, 397.3, 397.4